United States Patent
Miyamoto et al.

(10) Patent No.: US 6,810,468 B2
(45) Date of Patent: Oct. 26, 2004

(54) ASYNCHRONOUS FIFO CIRCUIT AND METHOD OF READING AND WRITING DATA THROUGH ASYNCHRONOUS FIFO CIRCUIT

(75) Inventors: Yuichiro Miyamoto, Hirakata (JP); Takashi Masuno, Hirakata (JP); Gouki Kuroda, Himeji (JP)

(73) Assignee: Matsushita Electrical Industrial Co., Ltd., Osaka (JP)

( * ) Notice: Subject to any disclaimer, the term of this patent is extended or adjusted under 35 U.S.C. 154(b) by 264 days.

(21) Appl. No.: 10/006,860

(22) Filed: Dec. 4, 2001

(65) Prior Publication Data

US 2002/0084807 A1 Jul. 4, 2002

(30) Foreign Application Priority Data

Dec. 5, 2000 (JP) ........................................ 2000-370543

(51) Int. Cl.[7] .............................................. G06F 12/00
(52) U.S. Cl. ............................ 711/156; 710/55; 714/54; 714/706
(58) Field of Search ................................. 714/706, 704, 714/819, 824, 21, 54; 710/55; 711/156

(56) References Cited

U.S. PATENT DOCUMENTS

| | | | | |
|---|---|---|---|---|
| 5,884,099 A | * | 3/1999 | Klingelhofer ................. | 710/52 |
| 6,006,286 A | * | 12/1999 | Baker et al. .................... | 710/22 |
| 6,101,329 A | * | 8/2000 | Graef ............................ | 710/52 |
| 6,550,023 B1 | * | 4/2003 | Brauch et al. ................. | 714/42 |
| 6,584,584 B1 | * | 6/2003 | Smith ........................... | 714/42 |
| 6,609,167 B1 | * | 8/2003 | Bastiani et al. .............. | 710/104 |
| 6,614,798 B1 | * | 9/2003 | Bishop et al. ............... | 370/428 |
| 2001/0043603 A1 | * | 11/2001 | Yu ............................... | 370/393 |

FOREIGN PATENT DOCUMENTS

JP 2001-176262 6/2001

OTHER PUBLICATIONS

Pham & Schmitt, "A High Throughput, Asynchronous, Dual Port FIFO Memory Implemented in ASIC Technology," IEEE, May 1989.*

* cited by examiner

*Primary Examiner*—Mano Padmanabhan
*Assistant Examiner*—Shane M. Thomas
(74) *Attorney, Agent, or Firm*—RatnerPrestia

(57) ABSTRACT

An asynchronous FIFO circuit has
 a memory;
 asynchronous read and write for reading a predetermined amount of data from and reading the predetermined amount of data into the memory on a first-in-first-out basis;
 an error write counter of counting up by 1 if the predetermined amount of data written into the memory contains an error;
 an error read counter of counting up by 1 if the predetermined amount of data read from the memory contains an error; and a comparator for
 comparing a value of the error write counter with a value of the error read counter, the comparator outputting a logic level of 0 when the value of the error write counter is coincident with the value of the error read counter, and the comparator outputting a logic level of 1 if the former value is different from the latter value.

6 Claims, 10 Drawing Sheets

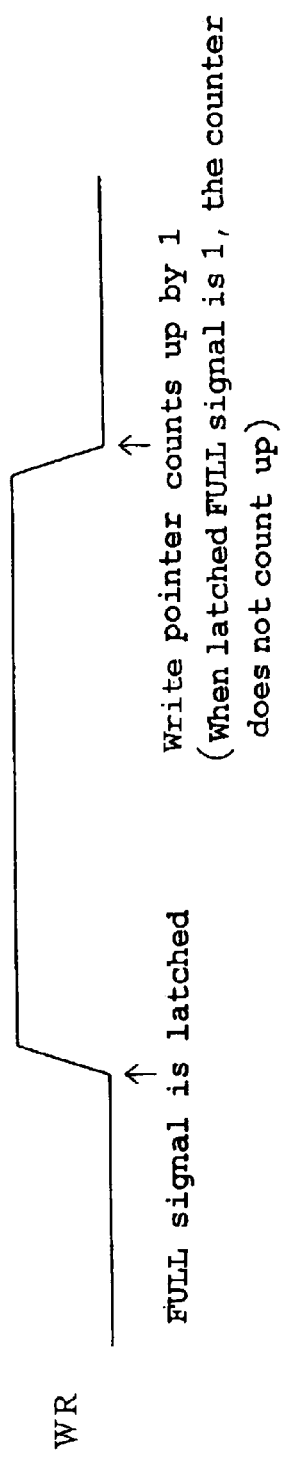
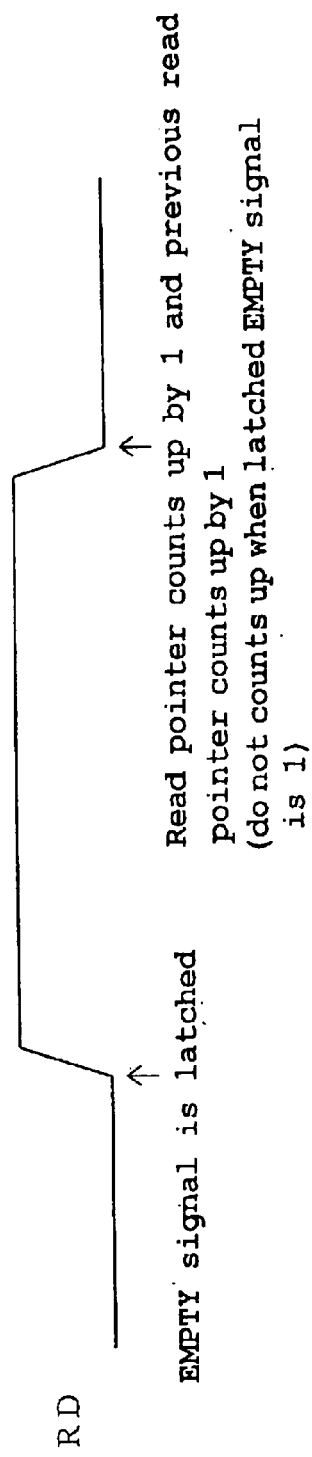
Fig. 5A
Fig. 5B

Fig. 8 A
Fig. 8 B
Binary counter
Gray code counter
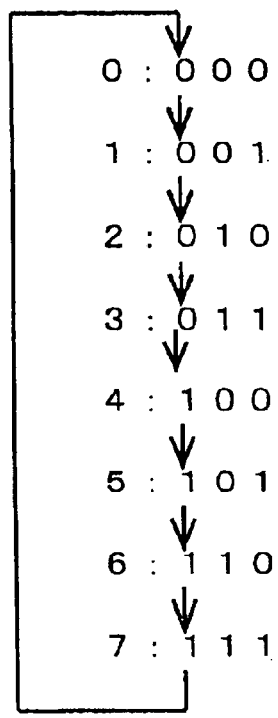
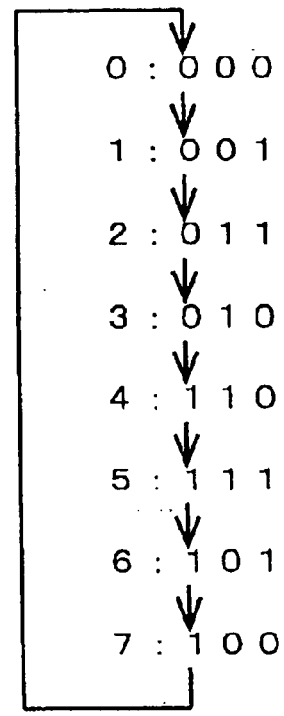

ASYNCHRONOUS FIFO CIRCUIT AND METHOD OF READING AND WRITING DATA THROUGH ASYNCHRONOUS FIFO CIRCUIT

BACKGROUND OF THE INVENTION

1. Field of the Invention

The present invention relates to a first-in-first-out circuit (referred to as FIFO circuit hereinafter), and more particularly to an asynchronous FIFO circuit or the like that ensures reliable data write and data read without using a clock signal.

2. Description of the Related Art

A conventional asynchronous FIFO circuit is known in which data is written and read reliably on different clock signals respectively or without using any clock signal. For example, Japanese Patent Application No. Hei 11-360248 discloses a conventional asynchronous FIFO circuit.

On the other hand, PC16550D manufactured by National Semiconductor Co. of U.S.A. is an industry-standard format of a start-stop synchronous serial communication device, and incorporates two 16-word asynchronous FIFO circuits for transmitting and receiving data.

As shown in FIG. 9, the asynchronous FIFO circuit (referred to receiver FIFO hereinafter) of PC16550D for receiving data stores words in sequence therein, each of the words including 8-bit data and 2-bit error flags. The major feature of PC16550D is that the Bit of the Line Status Register(referred to as LSR7 hereafter) can be read out as an indication as to whether at least one error flag is set to 1 in the receiver FIFO circuit.

The error flags are written into and read from the receiver FIFO circuit together with received data. Accordingly, the LSR7 bit changes in state when the received data is written into and read from the receiver FIFO circuit.

The LSR 7, as shown in FIG. 10, is a logical sum of all the columns that correspond to the error flags of respective words stored in the receiver FIFO. For PC16550, the LSR 7 is a logical sum of all the error flags of a total of 16 words.

If the number of words of the receiver FIFO circuit is increased, a serious inconvenience is encountered in configuring the receiver FIFO circuit. This is because a general purpose memory macro cannot be used to configure a receiver FIFO circuit.

In other words, increasing the number of words in the receiver FIFO circuit increases the number of columns that are involved in the generation of LSR 7 because the 7-bit LSR is a logical sum of all the columns that correspond to error flags of the respective words. When the number of words is increased, output lines must be needed to read independently from columns corresponding to the error flags of words stored in the memory that forms the receiver FIFO circuit. Therefore, a general-purpose memory macro cannot be used in order to increase the number of words. Increasing the number of words will increase chip area or the number of gates required.

This type of inconvenience becomes more prominent when a start-stop synchronous serial communication device is to be implemented by using ASIC (Application Specific Integrated Circuit) technique.

For example, Oxford Semiconductor Co. of U.K. sells OX16C950 that features compatibility with PC16550D, OX16C950 incorporating a 128-word asynchronous FIFO circuit for receiving and transmitting data. OX16C950 has a PC16550D-compatible feature and the number of words for a FIFO circuit extended to 128 words for both receiver and transmitter.

However, OX16C950 does not provide an LSR 7 that is a logical sum of all the error flags stored in the receiver FIFO circuit. Instead, when a receiving error occurs, OX16C950 is set and merely cleared immediately after 7-bit LSR is read out. Therefore, even if an error flag set to 1 exists in the receiver FIFO immediately after the 7-bit LSR has been read out, the 7-bit LSR is cleared. In this case, OX16C950 loses its compatibility with PC16550D.

This fact indicates that the software developed for PC16550D does not always run properly with OX16C950, impairing the commercial acceptance of OX16950.

SUMMARY OF THE INVENTION

The present invention was made in view of the aforementioned drawbacks. An object of the invention is to permit a FIFO circuit to be configured by using a general-purpose memory macro, the FIFO circuit being such that a LSR 7 is read to determine whether at least one word having a bit of a particular column set to 1 exists. The FIFO according to the present invention operates just like a receiver FIFO circuit incorporated in a conventional start-stop synchronous serial communication device compatible with PC16550D, which is an industry-standard format of start-stop synchronous serial communication device.

One aspect of the present invention is an asynchronous FIFO circuit comprising:

a memory;

asynchronous reading and writing means of reading a predetermined amount of data from and of writing the predetermined amount of data into said memory on a first-in-first-out basis;

an error write counter of counting counts up by 1 if the predetermined amount of data written into said memory contains an error;

an error read counter of counting up by 1 if the predetermined amount of data read from said memory contains an error;

comparing means of comparing a value of said error write counter with a value of said error read counter, said comparing means outputting a logic level of 0 when the value of said error write counter is coincident with the value of said error read counter, said comparing means outputting a logic level of 1 if the former value is different from the latter value.

Another aspect of the present invention is an asynchronous FIFO circuit comprising:

a memory having addresses for $2^N$ words, N being an integer;

a write pointer of counting up by 1 when writing of data into said memory has been completed, said write pointer counting up by 1 if the memory is not in a full state where the memory is full of data;

a read pointer of counting up by 1 when reading of data from said memory has been completed, said read pointer counting up by 1 if the memory is not in an empty state where all data has been read from said memory;

a previous read pointer of outputting an output incremented by 1 when reading of data has been completed, said previous read pointer outputting an output incremented by 1 if said memory is not in the empty state, said previous read pointer always outputting the output one less value than the value of said read pointer;

an empty flag generating circuit of detecting the empty state when a value of said write pointer is coincident with a value of said read pointer;

a full flag generating circuit of detecting the empty state of said memory when the value of said write pointer is coincident with a value of said previous read pointer;

a write pointer decoder of decoding the value of said write pointer to generate an address at which data is allowed to be written into said memory;

a data selector of selecting data from an address obtained by decoding the value of said read pointer;

a write flag OR circuit of taking a logic sum of predetermined bits contained in data written into said memory;

a read flag OR circuit of taking a logic sum of predetermined bits contained in data read from said memory;

an error write counter of counting up by 1 if said write flag OR circuit outputs a true logic level when data is written into said memory;

an error read counter of counting up by 1 if said read flag OR circuit outputs a true logic level when data is read from said memory; and an error comparing circuit of comparing a value of said error write counter with a value of said error read counter to detect whether the value of said error write counter and the value of said error read counter coincide.

Still another aspect of the present invention is the asynchronous FIFO circuit wherein said error write counter and said error read counter are formed of a gray code counter.

Yet still another aspect of the present invention is an asynchronous FIFO data reading and writing method comprising:

an asynchronous reading and writing step of reading a predetermined amount of data from and writing the predetermined amount of data into a memory on a first-in-first-out basis;

an error write counting step of counting up by 1 if the predetermined amount of data written into said memory contains an error;

an error read counting step of counting up by 1 if the predetermined amount of data read from said memory contains an error;

a comparing step of comparing a value of said error write counting step with a value of said error read counting step, said comparing step outputting a logic level of 0 when the value of said error write counting step is coincident with the value of said error read counting step, said comparing step outputting a logic level of 1 if the former value is different from the latter value.

Still yet another aspect of the present invention is an asynchronous FIFO data reading and writing method comprising:

a write point step of counting up by 1 when writing of data into a memory has been completed, said memory having addresses for $2^N$ words, N being an integer, said write point step counting up by 1 if the memory is not in a full state where the memory is full of data;

a read point step of counting up by 1 when reading of data from said memory has been completed, said read point step counting up by 1 if the memory is not in an empty state where all data has been read from said memory;

a previous read point step of outputting an output incremented by 1 when reading of data from said memory has been completed, said previous read point step outputting an output incremented by 1 if said memory is not in the empty state, said previous read point step always outputting the output one less value than said read pointer;

an empty flag generating step of detecting the empty state when a value of said write pointer is coincident with a value of said read point step;

a full flag generating step of detecting the full state of said memory when the value of said write pointing step is coincident with a value of said previous read pointing step;

a write pointer decode step of decoding the value of said write pointing step to generate an address at which data is allowed to be written into said memory;

a data select step of selecting data from an address obtained by decoding the value of said read pointing step;

a write flag OR step of taking a logic sum of predetermined bits contained in data written into said memory;

a read flag OR step of taking a logic sum of predetermined bits contained in data read from said memory;

an error write count step of counting up by 1 if said write flag OR step outputs a true logic level when data is written into said memory;

an error read count step of counting up by 1 if said read flag OR step outputs a true logic level when data is read from said memory; and an error comparing step of comparing a value of said error write count step with a value of said error read count step to detect whether the value of said error write count step and the value of said error read count step coincide.

A further aspect of the present invention is the asynchronous FIFO data reading and writing method wherein said error read write step an said error read step are formed of a gray code count step.

The aforementioned present invention is advantageous in that configuring a memory by the use of a general-purpose memory macro also ensures reading information as to whether at least one error flag set to 1 exists in the FIFO circuit.

The present invention is also advantageous in that no glitch occurs in a detection output that indicates whether at least one error flag set to 1 exists in the FIFO circuit.

BRIEF DESCRIPTION OF THE DRAWINGS

FIGS. 5A and 5B are timing charts illustrating the operation of a write pointer, read pointer, and previous read pointer;

FIGS. 8A and 8B illustrate a difference in the outputs of a binary counter and a gray code counter;

DESCRIPTION OF SYMBOLS

Figure 1:
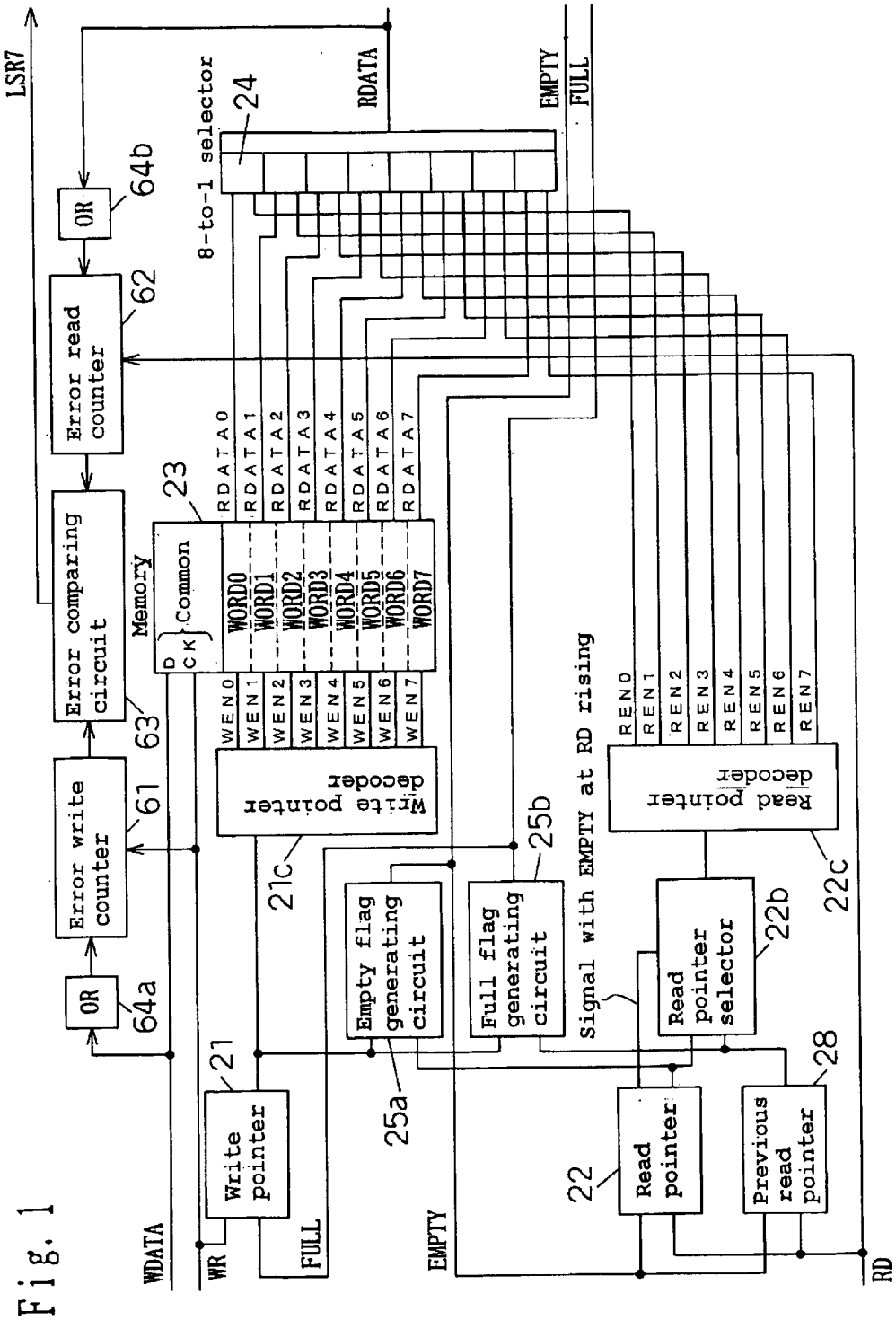
FIG. 1 illustrates an outline of an asynchronous FIFO circuit according to an embodiment of the present invention.

21 Write pointer
21c Write pointer decoder
22 Read pointer
22b Read pointer selector
22c Read pointer decoder
23 Memory
24 8-to-1 selector
25a Empty flag generating circuit
25b Full flag generating circuit
28 Previous read pointer
30 XNOR gate (1)
31 XNOR gate (2)
32 XNOR gate (3)
39 AND gate
61 Error write counter
62 Error read counter
63 Error comparing circuit
64a Write flag OR circuit
64b Read flag OR circuit
630: XNOR gate (1)
631 XNOR gate (2)
632 XNOR gate (3)
639 NAND gate
640 OR gate

DETAILED DESCRIPTION OF THE PREFERRED EMBODIMENTS

A preferred embodiment of the present invention will be described with reference to FIGS. 1–8.

Embodiment

FIG. 1 illustrates an embodiment of an asynchronous FIFO circuit according to the present invention.

Referring to FIG. 1, reference numeral 22 denotes a read pointer that indicates an address of a later described memory 23 from which data is read. The read pointer 22 is formed of an N-bit counter, which counts up by 1 immediately after data is read from the memory 23 if the memory 23 is not in an empty state (simply referred to as empty state hereinafter) where memory is not empty of data after data read. When the read pointer 22 counts up by 1 from $2^N-1$, the counter is reset to zero. Thus, the value of the read pointer 22 always indicates the next read address.

Reference numeral 28 denotes a previous read pointer which is formed of an N-bit counter just like the read pointer 22. When data read has been completed, the previous read pointer 28 is incremented by 1 if the memory 23 is not in the empty state. When the previous read pointer 28 is incremented by 1 from $2^N-1$, the previous read pointer 28 is reset to zero. It should be noted that initially the read pointer 22 is reset to zero while the previous read pointer 28 is reset to $2^N-1$. Thus, the value of the previous read pointer 28 always indicates an address one previous to that indicated by the read pointer 22.

Reference numeral 22b denotes a read pointer selector. When an empty flag generating circuit 25a, which will be described later, has outputted an EMPTY signal, i.e., when the memory 23 is in the empty state, the read pointer selector 22b selects the output of the previous read pointer 28. When the memory 23 is not in the empty state, the read pointer selector 22b selects the output of the read pointer 22. Reference numeral 22c denotes a read pointer decoder that decodes the output of the read pointer selector 22b to generate select signals REN0 to REN7 (collectively referred to as REN hereinafter) used for reading data from the memory 23.

Reference numeral 21 denotes a write pointer that indicates an address of the memory 23 into which data is written. The write pointer 21 is formed of an N-bit counter. When data write has been completed, the write pointer 21 counts up by 1 if the memory 23 is not in a full state (hereinafter referred to as full state simply) where the memory 23 is full of data. When the write pointer 21 counts up by 1 from $2^N-1$, the write pointer 21 is reset to zero. Thus, the value of the write pointer 21 always indicates the next write address.

Reference numeral 21c denotes a write pointer decoder that decodes the output of the write pointer 21 to generate write enabling signals WEN0 to WEN7 (collectively referred to as WEN hereinafter), so that data can be written into the memory 23 at a corresponding address.

Reference numeral 23 denotes the memory 23 having addresses for $2^N$ words. In the present embodiment, the memory storing 8-words of data is presented. Since $8=2^3$, N=3 in the embodiment.

Reference numeral 24 denotes an 8-to-1 selector that selects data of specified address by the select signal REN outputted from the read pointer decoder 22c and outputs the data as read data, from the memory 23.

Reference numeral 25a denotes an empty flag generating circuit. When the value of the write pointer 21 coincides with the value of the read pointer 22, i.e., when no unread data remains in the memory 23 (referred to as unread hereinafter), the empty flag generating circuit 25a generates the EMPTY signal that indicates that the memory 23 is in the empty state.

Reference numeral 25b denotes a full flag generating circuit. When the value of the write pointer 21 coincides with the value of the previous read pointer 28, i.e., when a total of $2^N-1$ of unread data exists in the memory 23, the full flag generating circuit 25b outputs a FULL signal that indicates that the memory 23 is in the full state.

Reference numeral 61 denotes an error write counter that is formed of an N-bit counter. When a word having at least one of the error flags set to 1 is written into the memory 23, the error write counter 61 counts up by 1 upon a write signal WR as a clock. When the error write counter 61 counts up from $2^N-1$, the error write counter 61 is reset to 0, or wraps around to 0. Therefore, the value of error write counter 61 is equal to a remainder when an accumulated number of times that a word having at least one of the error flag set to 1 is stored into the memory 23 is divided by $2^N$. N is a positive integer such that N=$\log_2$ (number of locations in the memory). In the present embodiment, N=3.

Reference numeral 62 denotes an error read counter that counts up by 1 upon a RD signal as a clock when a word having at least one of the error flag set to 1 is read from the memory 23. The error read counter 62 is also formed of an N-bit counter. When the error read counter 62 counts up by 1 from $2^N-1$, the error read counter 62 returns to 0. Thus, the value of the error read counter 62 is equal to a remainder when an accumulated number of times that a word having at least one of the error flag set to 1 is read from the memory 23 is divided by $2^N$.

Reference numeral 63 denotes an error comparing circuit as comparing means of the present invention that compares the value of the error write counter 61 with the value of the error read counter 62. The error comparing circuit 63 outputs a logic level 0 when the value of the error write counter 61 is equal to the value of the error read counter 62. The error comparing circuit 63 outputs a logic level 1 when the value of the error write counter 61 is not equal to the value of the error read counter 62.

Reference numeral 64a denotes a write flag OR circuit and reference numeral 64b denotes a read flag OR circuit.

The write flag OR circuit 64a and read flag OR circuit 64b generate logical sums of all error flags in a word and send the logical sums to the error write counter 61 and error read counter 62, respectively. When the output of the write flag OR circuit 64a is true, if the write signal WR is generated, the error write counter 61 counts up by 1. When the value of the read flag OR circuit 64b is true, if the read signal RD is generated, the error read counter 62 counts up by 1.

Figure 2:
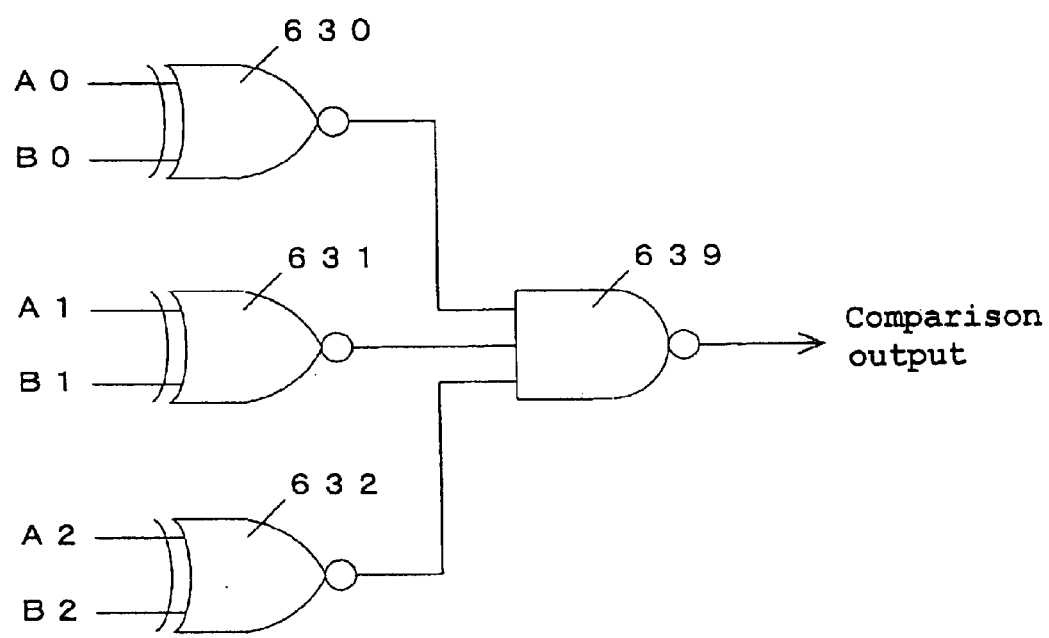
FIG. 2 is a circuit diagram illustrating an example of a coincidence detecting circuit that forms an error comparing circuit.

FIG. 2 is a circuit diagram illustrating an example of a coincidence detecting circuit that forms the error comparing circuit 63. In the present embodiment, N=3, and therefore the error comparing circuit 63 has three XNOR gates 630–632. The inputs A0–A2 receive three bits from the error write counter 61. The inputs B0–B2 receive three bits from the error read counter 62. Logical sums of inputs A's and inputs B's are taken and then the logical sums are inputted to a NAND gate 639 which outputs a negated logical product of the sums. The output of the NAND gate 639 is an output of the error comparing circuit 63.

Figure 3:
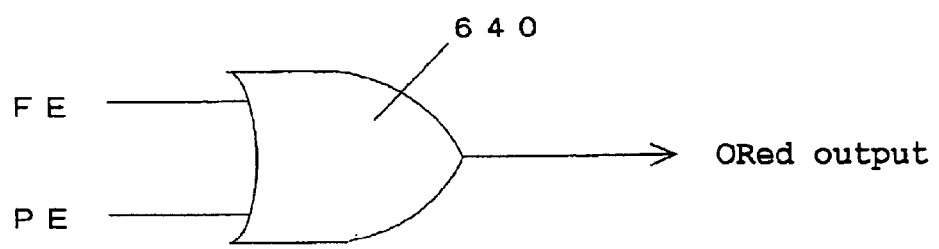
FIG. 3 is a schematic diagram illustrating an example of a write flag OR circuit and read flag OR circuit.
Figure 9:
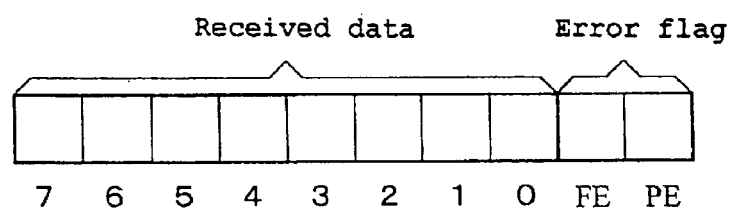
FIG. 9 illustrates received data and an error flag combined into one word.
Figure 10:
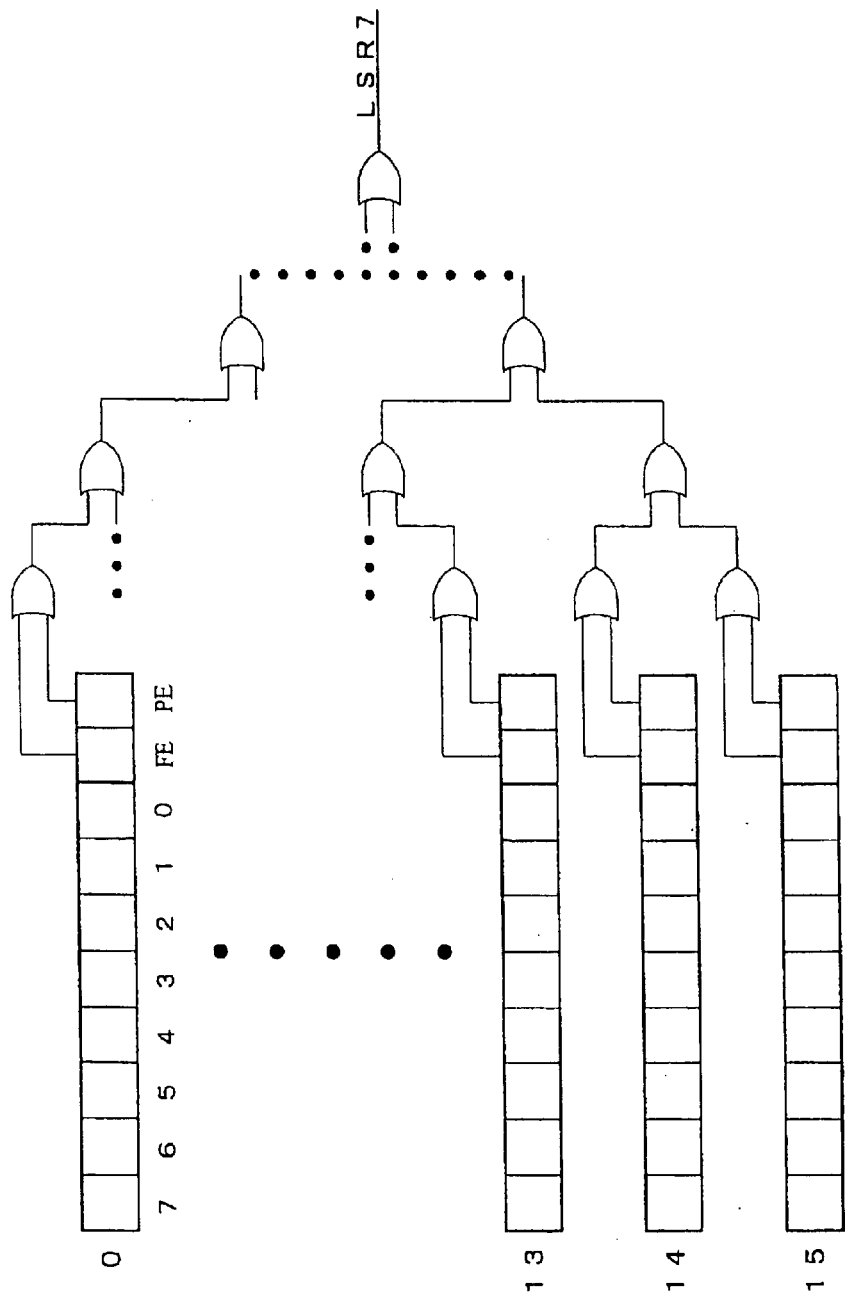
FIG. 10 illustrates a logic sum of all the error flags in the FIFO circuit.

FIG. 3 is a schematic diagram illustrating the write flag OR circuit 64a and read flag OR circuit 64b. In the present embodiment, it is assumed that the error flag in a word is of a 2-bit structure as shown in FIG. 9. Thus, the OR circuits 64a and 64b are formed of a 2-input OR gate. Generally speaking, if a word has M-bit error flags, the OR circuits 64a and 64b are formed of an M-input OR circuit.

The operation of a FIFO circuit according to the embodiment of the aforementioned configuration will be described in order to describe an embodiment of data reading method from an asynchronous FIFO and data writing method into an asynchronous FIFO according to the present invention.

First, a FIFO circuit will be described in terms of basic operation thereof. When write data WDATA accompanied with a write signal WR is received from an external circuit, the write data WDATA and write signal WR are directed to all the words of the memory 23.

The write pointer decoder 21c decodes the output of the write pointer 21 to provide the write enabling signal WEN to the memory 23, so that the write data WDATA is written into an address indicated by the write pointer 21. When the write data WDATA has been written into the memory 23, the write pointer 21 counts up by 1 to indicate the address at which the next data is to be written unless the memory 23 is in the full state.

When the memory 23 is in the full state, the address indicated by the write pointer 21 is the same as that indicated by the previous read pointer 28. Because this address is an address from which data has been already read out, unread data will not be destroyed, even if the write signal WR is received.

When, the read signal RD is received from an external circuit, if the memory 23 is not in the empty state, the read pointer selector 22b selects the output of the read pointer 22 to provide the output to the read pointer decoder 22c.

The read pointer decoder 22c decodes an output selected by the read pointer selector 22b to provide the output to the 8-to-1 selector 24. As a result, the 8-to-1 selector 24 selects address data indicated by the read pointer 22 and provides the selected data as read data RDATA to an external circuit. When the data has been read from the memory 23, the read pointer 22 counts up by 1 to indicate an address from which the next data is read. At this moment, the previous read pointer 28 also counts up by 1.

When the memory 23 is in the empty state, if the read signal RD is received, the output of the previous read pointer 28 is decoded instead of the output of the read pointer 22, so that data is again read from the memory 23 at the previous address. If the memory 23 is in the empty state, the read pointer 22 does not count up by 1 nor does the previous read pointer 28 count up by 1, so that the read pointer 22 and the previous read pointer 28 hold their current values.

The empty flag generating circuit 25a compares the write pointer 21 and the read pointer 22 all times to detect a coincidence between the two. When the unread data does not exist in the memory 23, the values of the write pointer 21 and read pointer 22 become coincident so that the empty flag generating circuit 25a outputs the EMPTY signal. The read pointer 22 latches the EMPTY signal on the read signal RD to output the EMPTY signal to the read pointer selector 22b.

The read pointer selector 22b can be disposed so that the read pointer decoder 22c always receives the output of the read pointer 22. This arrangement is less advantageous in that when the memory 23 is in the empty state, if the read signal RD is received, undefined data is outputted as read data RDATA from the memory 23.

Figure 4:
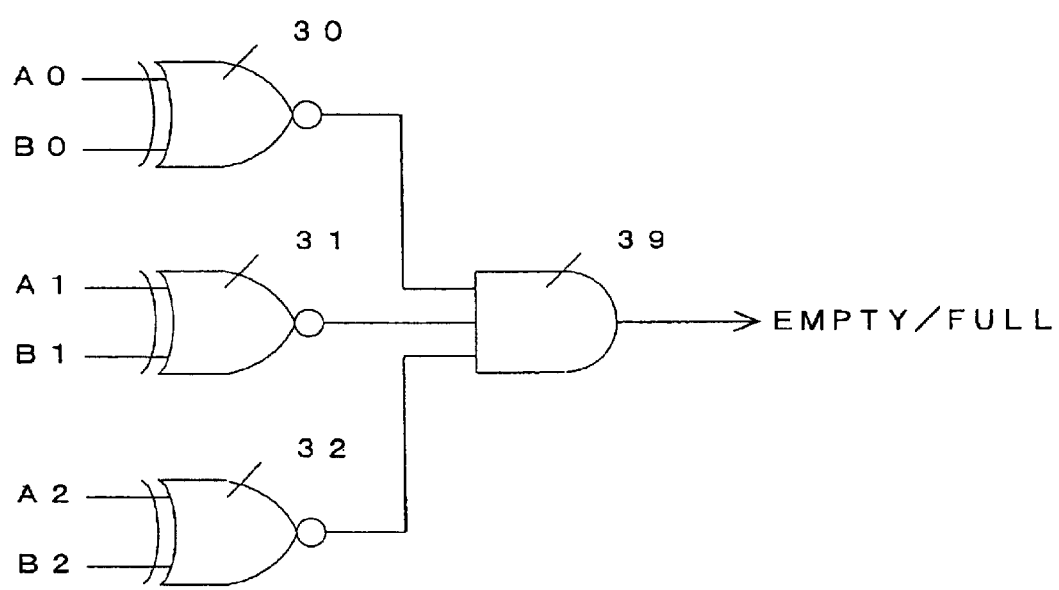
FIG. 4 is a circuit diagram illustrating an example of a coincidence detecting circuit that forms an empty flag generating circuit and a full flag generating circuit.

FIG. 4 is a circuit diagram illustrating an example of a coincidence detecting circuit that forms the empty flag generating circuit 25a and the full flag generating circuit 25b. In the present embodiment, N=3, and therefore the coincidence detecting circuit has three XNOR gates 30–32. The inputs A0–A2 receive three bits from the write pointer 21. The inputs B0–B2 of the empty flag generating circuit 25a receive three bits from the read pointer 22 while the inputs B0–B2 of the full flag generating circuit 25b receive three bits from the previous read pointer 28. Logical sums of the inputs A's and inputs B's are taken to check whether they are coincident, then the logical sums are inputted to an AND gate 39 which takes a logical product of the logical sums.

The coincidence detecting circuit shown in FIG. 4 can cause a glitch in its output if a plurality of input bits change in logic state simultaneously. In order to eliminate the chance of glitch occurring, the write pointer 21, read pointer 22, and previous read pointer 28 can be configured by using a gray code counter.

FIG. 5A illustrates the operation of the write pointer 21. FIG. 5B illustrates the operation of the read pointer 22 and previous read pointer 28. As shown in FIG. 5A, the write pointer 21 according to the embodiment latches the FULL signal, generated by the full flag generating circuit 25b, on the rising edge of the write signal WR. If the latched signal is of a logic level 0, then the write pointer 21 counts up by 1 on the falling edge of the write signal WR.

Likewise, as shown in FIG. 5B, the read pointer 22 and previous read pointer 28 latch the EMPTY signal, outputted from the empty flag generating circuit 25a, on the rising edge of the read signal RD. If the latched signal is of a logic level 0, then the read pointer 22 and previous read pointer 28 count up by 1 on the falling edge of the read signal RD.

As described above, after the FULL signal and EMPTY signal are latched, the data write and data read are performed. Then, after data write and data read have been performed, the write pointer 21, read pointer 22, and previous read pointer 28 count up by 1. Thus, the write pointer 21 will not change in state during the data write, and the read pointer 22 or previous read pointer 28 will not change in state during the data read. This ensures data write and data read to be performed stably and this ensures normal data write to be performed even when data is being read or and normal data read to be performed even when data is being written.

Figure 6:
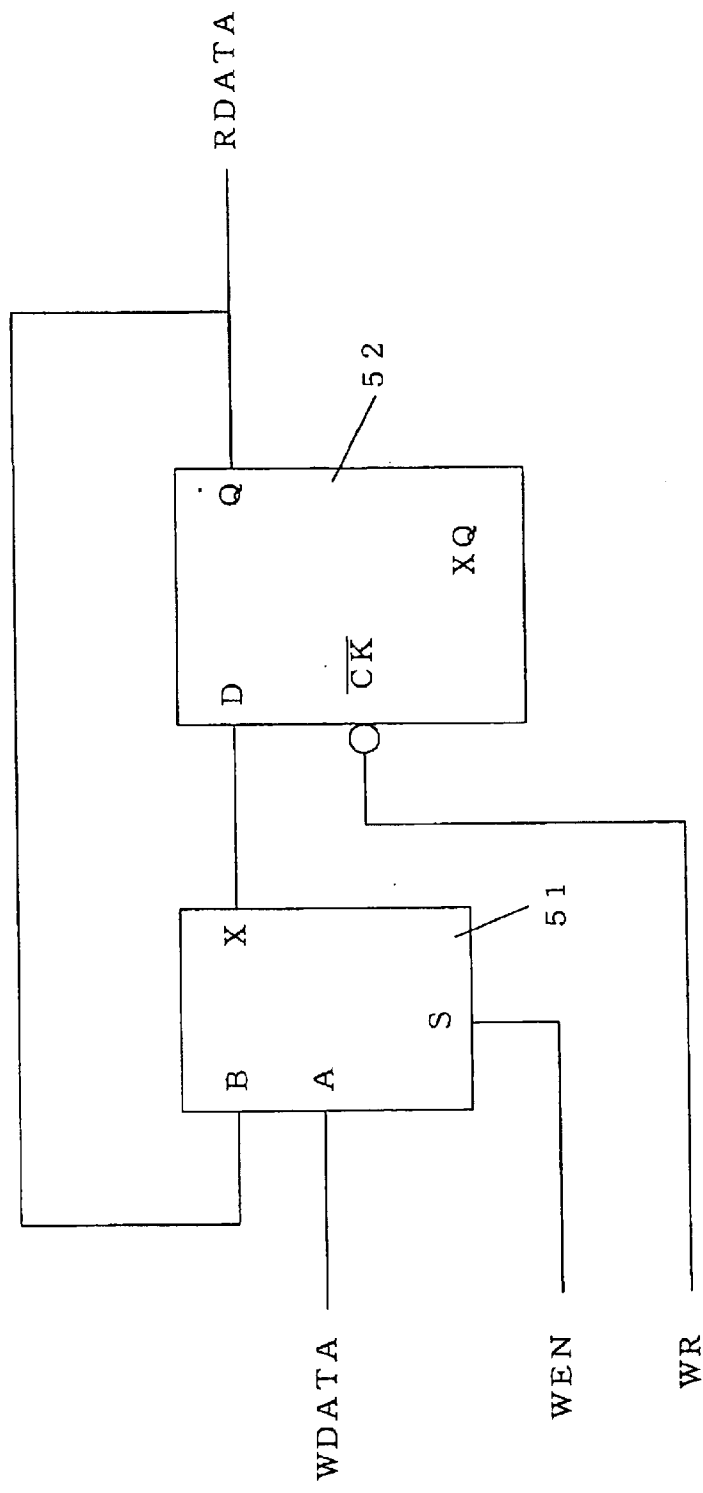
FIG. 6 illustrates an example of a circuit for one bit of one of words that form a memory.

FIG. 6 illustrates an example of a circuit for one bit of one of words that form the memory 23. Referring to FIG. 6, reference numeral 51 denotes a 2-to-1 selector that selects an input A when the write enabling signal WEN is of a logic level 1, and an input B when the write enabling signal WEN is of a logic level 0.

Reference numeral 52 denotes a D-type flip flop. The D-type flip flop 52 operates in such a way that when the write signal WR which is common to all the bits in the memory 23 is inputted, the signal inputted to the D input terminal is set to the output terminal Q. Referring to FIG. 6, when the write data WDATA is received, if the write enabling signal WEN is of a logic level 1, the 2-to-1 selector selects WDATA to direct the WDATA to output to the D input terminal of the D-type flip flop 52. Then, the write data WDATA is set to the output Q of the D-type flip flop 52 at the timing of inputting the write signal WR.

When the write enabling signal WEN is of a logic level 0, the 2-to-1 selector 51 selects the output Q of the D-type flip flop 52 and directs the output Q to the D input terminal. This implies that the same logic state is again set to the output terminal Q of the D-type flip flop 52 at the timing of inputting write signal WR.

Figure 7:
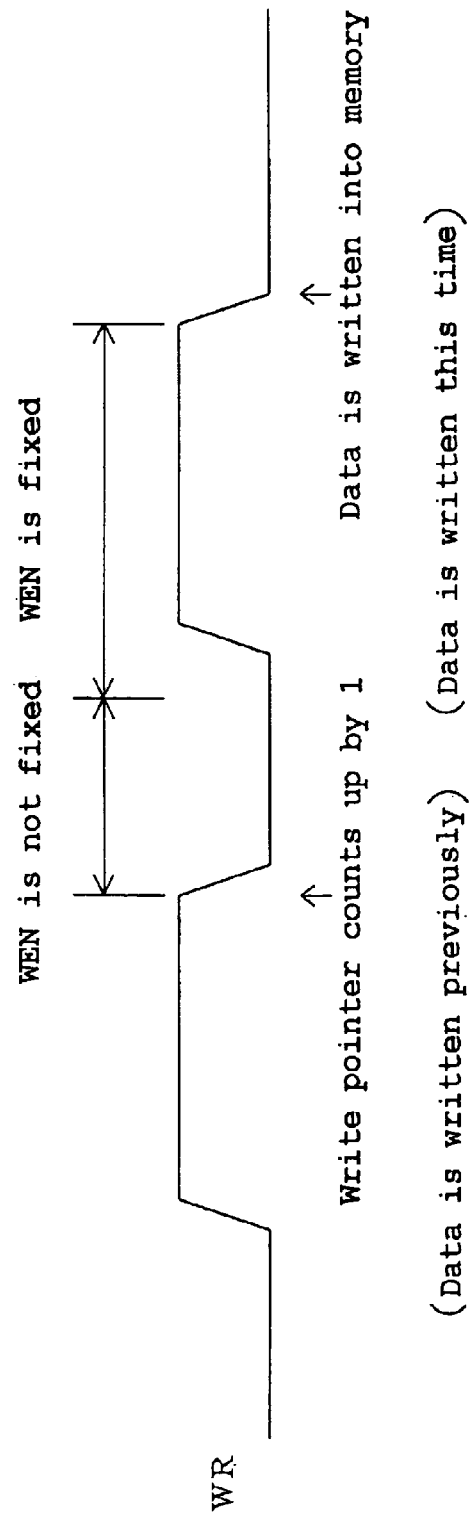
FIG. 7 is a timing chart when data is written into the memory.

FIG. 7 is a timing chart when data is written into the memory 23. The address indicated by the write pointer 21 remains the same after data was written last time and the write pointer 21 counted up by 1. Thus, even if a delay occurs in inputting of the write enabling signal WEN when the write enabling signal passes through the write pointer decoder 21c, the write enabling signal WEN is ready before the write signal WR is set up. Then, the data is written into the memory 23 upon the falling edge of the write signal WR.

As described above, in the present embodiment, the asynchronous FIFO circuit includes the write pointer 21, read pointer 22, previous read pointer 28, and empty flag generating circuit 25a and full flag generating circuit 25b that check the outputs of the pointers 21, 22, and 28 to determine whether the outputs are coincident, thereby detecting whether the memory 23 is in the full state or in the empty state. The write address is fixed upon completion of data write last time and the read address is fixed on the rising edge of the read signal RD and the write address and read address remain the same during the data write and data read, respectively. This ensures that the FIFO circuit operates without malfunction regardless of whether the memory 23 is in the full state, empty state, or state between full and empty states.

The FULL signal and EMPTY signal are latched on the rising edges of the write signal WR and read signal RD, respectively. The write pointer 21, read pointer 22 and previous read pointer 28 count up by 1 on the falling edges of the write signal WR or the read signal RD. Thus, the latched signals remain stable for widths of the write signal WR and the read signal RD, respectively, so that the write pointer 21, read pointer 22, and previous read pointer 28 count up by 1 reliably.

The following description verifies that the output of the comparing means or error comparing circuit according to the present invention becomes a logic level 1 if the 7 bit LSR or at least one error flag of a logic level 1 exists in the memory 23 that forms the FIFO circuit, and becomes a logic level 0 if an error flag of a logic level 1 does not exist in the memory 23.

When an error flag of a logic level 1 does not exist in the memory 23, it is clearly true that the accumulated number of times that a word having at least one error flag of a logic level 1 is written into the memory 23 is coincident with the accumulated number of times that a word having at least one error flag of a logic level 1 is read from the memory 23. Thus, the respective remainders are also coincident, and therefore the value of the error write counter 61 becomes coincident with the value of the error read counter 62, so that the output of the comparing circuit becomes a logic level 0.

When an error flag of a logic level 1 exists in the memory 23 having a FIFO structure, it is clearly true that the accumulated number of times that a word having at least one error flag of a logic level 1 is written into the memory 23 is not coincident with the accumulated number of times that a word having at least one error flag of a logic level 1 is read from the memory 23. Because the FIFO circuit holds only a maximum of $2^N-1$ words therein as described above, and therefore the difference between the two accumulated numbers is a maximum of $2^N-1$, when the two accumulated numbers are divided by $2^N$.

When the two accumulated numbers are divided by $2^N$, the remainders are still different and the value of the error write counter 61 differs from the value of the error read counter 62. Thus, the output of the comparing circuit becomes a logic level 1. Thus, the logical state of the output of the comparing circuit is equal to that of the LSR 7.

The coincidence detecting circuit of FIG. 2 can cause a glitch on the output thereof if a plurality of input bits change in logic state simultaneously. That is, the LSR 7 may have a glitch. In order to eliminate the chance of-glitch occurring, the error write counter 61 and error read counter 62 can be formed of a gray code counter.

FIGS. 8A and 8B illustrate a difference in the outputs of a binary counter and a gray code counter when N=3, FIG. 8A illustrating the output of the binary counter and FIG. 8B illustrating the output of the gray code counter. When the counters count up in increments of one sequentially, two bits can change in logic state simultaneously in the binary counter while only one bit changes at a time in the gray code counter. Thus, using the gray code counter to form the error write counter 61 and error read counter 62 eliminates the chance of glitch occurring at the LSR 7.

When the write pointer 21, read pointer 22 are formed of a gray code counter, the write pointer decoder 21c, and read pointer decoder 22c can be of the same configuration that the write pointer 21 and read pointer 22 are formed of a binary counter. The configuration of such a gray code counter is well known and description thereof is omitted.

As described above, in the present embodiment, the error write counter 61 counts the number of times that a word having at least one error flag of a logic level 1 is written into the memory 23 having a FIFO structure, and the error read counter 62 counts the number of times that such a word is read from the memory having the FIFO structure. The error comparing circuit 63 detects whether the values of the counters 61 and 62 are coincident, thereby detecting whether a word having an error flag set to a logic 1 exists in the FIFO circuit. Therefore, an output is not required to be read from the memory 23 at particular column independent from the others, so that a general purpose memory macro can be used to form the memory 23.

When the asynchronous FIFO circuit of the aforementioned configuration is used as a receiver FIFO, the output of the error comparing circuit 63 is equal to the value of LSR 7 of PC16550D, so that a general purpose memory macro can be employed to configure a receiver FIFO circuit required of a start-stop system synchronous serial communication device compatible with PC16550D. Further, the aforementioned construction allows easy extension of the size of a receiver FIFO circuit incorporated in a start-stop synchronous serial communication device compatible with PC16550D of an industry-standard format.

The aforementioned embodiment employed an asynchronous FIFO circuit that includes the write pointer 21, write pointer decoder 21c, read pointer 22, read pointer selector 22b, read pointer decoder 22c, memory 23, 8-to-1 selector 24, empty flag generating circuit 25a, full flag generating circuit 25b, and previous read pointer 28. The asynchronous FIFO circuit of the invention is not limited to this configuration and can be of any other configuration provided that data can be written into and read from the memory 23 asynchronously through the FIFO on a word basis, i.e., on a predetermined amount of data basis.

As is clear from the above description, the present invention of the aforementioned configuration offers the following advantages.

That is, the use of a general purpose memory macro allows configuring of an asynchronous FIFO circuit that can identify whether a word having a bit of a particular column set to a logic 1 exists.

What is claimed is:

1. An asynchronous FIFO circuit comprising:
   a memory;
   asynchronous reading and writing means of reading a predetermined amount of data from and of writing the predetermined amount of data into said memory on a first-in-first-out basis, the predetermined amount of data including a plurality of words stored in a respective plurality of address locations of the memory;
   an error write counter of counting up by 1 for each word of the plurality of words containing an error flag that is written into said respective plurality of address locations;
   an error read counter of counting up by 1 for each word of the plurality of words containing an error flag that is read from said respective plurality of address locations;
   comparing means of comparing a value of said error write counter with a value of said error read counter, said comparing means outputting a logic level of 0 when the value of said error write counter is coincident with the value of said error read counter, and said comparing means outputting a logic level of 1 if the former value is different from the latter value, wherein the logic level of 1 indicates at least one error flag is set in the plurality of words stored in the respective plurality of address locations.

2. An asynchronous FIFO circuit comprising:
   a memory having addresses for $2^N$ words, N being a positive integer;
   a write pointer of counting up by 1 when writing data into said memory is completed, said data including a plurality of words stored in a respective plurality of address locations of the memory, said write pointer counting up by 1 if the memory is not in a full state where the memory is full of data;
   a read pointer of counting up by 1 when reading data from said memory is completed, said data including a plurality of words stored in a respective plurality of address locations of the memory, said read pointer counting up by 1 if the memory is not in an empty state where all data has been read from said memory;
   a previous read pointer of outputting an output incremented by 1 when reading data is completed, said previous read pointer outputting an output incremented by 1 if said memory is not in the empty state, said previous read pointer always outputting the output of one less value than the value of said read pointer;
   an empty flag generating circuit of detecting an empty state when a value of said write pointer is coincident with a value of said read pointer;
   a full flag generating circuit of detecting the empty state of said memory when the value of said write pointer is coincident with a value of said previous read pointer;
   a write pointer decoder of decoding the value of said write pointer to generate an address at which data is allowed to be written into said memory;
   a data selector of selecting data from an address obtained by decoding the value of said read pointer;
   a write flag OR circuit of taking a logic sum of predetermined bits contained in data written into said memory;
   a read flag OR circuit of taking a logic sum of predetermined bits contained in data read from said memory;
   an error write counter of counting up by 1 if said write flag OR circuit outputs a true logic level when data is written into said memory, the error write counter counting up by 1 for each word of the plurality of words containing an error flag that is written into said memory;
   an error read counter of counting up by 1 if said read flag OR circuit outputs a true logic level when data is read from said memory; the error read counter counting up by 1 for each word of the plurality of words containing an error flag that is read from said memory; and
   an error comparing circuit of comparing a value of said error write counter with a value of said error read counter to detect whether the value of said error write counter and the value of said error read counter coincide,
   wherein the error comparing circuit outputs a logic level of 0 when the value of said error write counter is coincident with the value of said error read counter, and said error comparing circuit outputs a logic level of 1 if the former value is different from the latter value, and the logic level of 1 indicates at least one error flag is set in the plurality of words stored in the memory.

3. The asynchronous FIFO circuit according to claim 1 or 2, wherein said error write counter and said error read counter are formed of a gray code counter.

4. An asynchronous FIFO data reading and writing method comprising:
   an asynchronous reading and writing step of reading a predetermined amount of data from and writing the predetermined amount of data into a memory on a first-in-first-out basis, the predetermined amount of data including a plurality of words stored in a respective plurality of address locations of the memory;
   an error write count step of counting up by 1 for each word of the plurality of words containing an error flag that is written into said respective plurality of address locations;
   an error read count step of counting up by 1 for each word of the plurality of words containing an error flag that is read from said respective plurality of address locations;
   a comparing step of comparing a value of said error write count step with a value of said error read count step, said comparing step outputting a logic level of 0 when the value of said error write count step is coincident with the value of said error read count step, and said comparing step outputting a logic level of 1 if the former value is different from the latter value, wherein the logic level of 1 indicates at least one error flag is set in the plurality of words stored in the respective plurality of address locations.

5. An asynchronous FIFO data reading and writing method comprising:

a write point step of counting up by 1 when writing data into a memory is completed, said memory having addresses for $2^N$ words, N being a positive integer, said write point step counting up by 1 if the memory is not in a full state where the memory is full of data, said data including a plurality of words stored in a respective plurality of address locations of the memory;

a read point step of counting up by 1 when reading data from said memory is completed, said read point step counting up by 1 if the memory is not in an empty state where all data has been read from said memory, said data including a plurality of words stored in a respective plurality of address locations of the memory;

a previous read point step of outputting an output incremented by 1 when reading data from said memory is completed, said previous read point step outputting an output incremented by 1 if said memory is not in the empty state, said previous read point step always outputting the output of one less value than said read pointer;

an empty flag generating step of detecting an empty state when a value of said write pointer is coincident with a value of said read point step;

a full flag generating step of detecting the full state of said memory when the value of said write pointing step is coincident with a value of said previous read pointing step;

a write pointer decode step of decoding the value of said write pointing step to generate an address at which data is allowed to be written into said memory;

a data select step of selecting data from an address obtained by decoding the value of said read pointing step;

a write flag OR step of taking a logic sum of predetermined bits contained in data written into said memory;

a read flag OR step of taking a logic sum of predetermined bits contained in data read from said memory;

an error write count step of counting up by 1 if said write flag OR step outputs a true logic level when data is written into said memory, an error write counter counting up by 1 for each word of the plurality of words containing an error flag that is written into said memory;

an error read count step of counting up by 1 if said read flag OR step outputs a true logic level when data is read from said memory, an error read counter counting up by 1 for each word of the plurality of words containing an error flag that is read from said memory; and an error comparing step of comparing a value of said error write count step with a value of said error read count step to detect whether the value of said error write count step and the value of said error read count step coincide, wherein the error comparing step outputs a logic level of 0 when the value of said error write count step is coincident with the value of said error read count step, and said error comparing step outputs a logic level of 1 if the former value is different from the latter value, and the logic level of 1 indicates at least one error flag is set in the plurality of words stored in the memory.

6. The asynchronous FIFO data reading and writing method according to claim 4 or 5, wherein said error write count step and said error read count step are formed of a gray code count step.

* * * * *